Dec. 3, 1957 C. H. WILLSEY 2,815,055
MECHANISM FOR SEPARATING EGG WHITES FROM EGG YOLKS
Filed May 16, 1955 5 Sheets-Sheet 1

INVENTOR.
Charles H. Willsey
BY
Cromwell, Greist & Warden
Attys.

Dec. 3, 1957  C. H. WILLSEY  2,815,055
MECHANISM FOR SEPARATING EGG WHITES FROM EGG YOLKS
Filed May 16, 1955  5 Sheets-Sheet 3

INVENTOR.
Charles H. Willsey
BY
Cromwell, Greist & Warden
Attys.

Dec. 3, 1957 C. H. WILLSEY 2,815,055
MECHANISM FOR SEPARATING EGG WHITES FROM EGG YOLKS
Filed May 16, 1955 5 Sheets-Sheet 5

INVENTOR.
Charles H. Willsey
BY
Cromwell, Greist & Warden
Attys.

United States Patent Office 2,815,055
Patented Dec. 3, 1957

2,815,055

MECHANISM FOR SEPARATING EGG WHITES FROM EGG YOLKS

Charles H. Willsey, Topeka, Kans.

Application May 16, 1955, Serial No. 508,663

12 Claims. (Cl. 146—2)

This invention relates to an egg handling apparatus and is more particularly concerned with improvements in mechanism for receiving from an egg breaking apparatus the contents of successive eggs, for separating the whites from the yokes and for delivering the whites and the yokes into separate containers.

It is a general object of the present invention to provide an improved mechanism adapted to be incorporated in an egg breaking machine, for receiving the egg contents from the broken shell portions of successive eggs, for conveying the same past an inspection station where any broken yolks and inedible eggs, which are observed, may be discharged from the receptacles, for separating the egg whites from the yolks and depositing the same in separate containers and for automatically cleaning and sterilizing any receptacles from which broken or inedible eggs have been discharged.

It is a further object of the invention to provide an egg contents separating mechanism adapted for use in an egg cracking machine which is simple in construction, which will operate in an efficient and rapid manner to separate the whites from the yolks, and which provides for the disposal of any broken yolks or inedible eggs which are delivered by the cracking machine and for automatic cleansing of the portions of the mechanism which have been contacted by a broken yolk or an inedible egg.

It is another object of the invention to provide an egg contents separating mechanism which comprises a conveyor having mounted in pivoted relation thereon a plurality of receptacles for receiving at a cracking station the contents of successive broken eggs and for carrying the same away from the cracking station along a predetermined path together with associated devices whereby the receptacles may be manually conditioned or adjusted to dump at a predetermined point any eggs which are found by the operator to be inedible or defective while the eggs in normal condition are separated and deposited in separate receivers, and whereby any receptacles which are initially dumped to dispose of inedible or defective eggs are passed through a washing or cleansing chamber for cleansing or reconditioning the receptacles for reception of the contents of an egg at the breaking station.

It is another object of the invention to provide a mechanism for separating egg whites from egg yolks which comprises a conveyor having a plurality of egg receiving assemblies mounted thereon, with each of the assemblies being detachably connected to the conveyor and said assemblies comprising a bowl-like structure consisting of a relatively fixed ring member and a relatively movable bottom yolk cup adapted to be moved away from the ring to permit the white to separate from the yolk and drain over the edge of the cup into a white receiving pan which is pivotally mounted beneath the bowl, the white receiving pan being carried on a bracket which connects the bowl in pivoted relation to the conveyor and being adapted to be swung outwardly relative to the conveyor whereby the white may be separated from the yolk, with the white collected in the pan below and the yolk retained in the receiving bowl, and thereafter the pan and the bowl may be successively pivoted downwardly to a position relative to the conveyor to dump the white into one collecting receptacle and the yolk into another collecting receptacle.

It is another object of the invention to provide a mechanism for separating egg whites and yolks wherein a plurality of assemblies are pivotally mounted on an endless conveyor for receiving the whole egg contents, which assemblies are so constructed and supported that they may be tilted relative to the conveyor at a predetermined point along the path of movement thereof sufficiently to dump the contents after the white has been separated from the yolk by movement of a portion of the assembly relative to the remainder thereof, the conveyor having associated therewith members for supporting the assembly at predetermined points along the path thereof with the parts thereof in various positions relative to each other to permit separation of the yolk from the white and finally to dump both the white and the yolk into separate collecting receptacles.

It is a further object of the invention to provide in an egg cracking machine an egg contents receiving and separating mechanism comprising a plurality of egg receiving assemblies which are pivotally and removably mounted on an endless conveyor, an inspection station located adjacent the point where the eggs are broken and dumped into the assemblies, where the contents of each assembly may be observed by the operator and the assemblies may be manipulated to dump the contents thereof when the operator observes that the yolk is broken or that an inedible egg has been deposited therein, and a washing mechanism arranged adjacent the path of movement of the conveyor for washing and sterilizing those assemblies which have been dumped to dispose of the contents thereof.

These and other objects and advantages of the invention will be apparent from a consideration of the mechanism which is shown by way of illustration in the accompanying drawing, wherein.

The mechanism shown in the drawings for the purpose of illustrating the present invention is particularly designed for incorporation in an egg cracking machine of the general type which is disclosed in applicant's copending application Serial No. 315,447, filed October 18, 1953, now Patent No. 2,760,536, but it will be understood that the conveying and separating mechanism herein disclosed may be used with cracking mechanisms other than the cracking mechanism specifically described in the copending application. The present mechanism may be employed with any cracking mechanism in which successive eggs are brought up to a cracking station, each successive egg is cracked and the shell separated into two portions permitting the contents to be dumped or allowed to fall by gravity into a receptacle positioned beneath the same. The present mechanism provides a plurality of egg contents receiving assemblies which are mounted on an endless conveyor arranged to move the assemblies to position successive assemblies at the cracking station for receiving the whole egg contents and then away from the same along a predetermined path, with each assembly being moved to the cracking station in proper timed relation to receive the contents of a single egg.

Referring to the drawings, the conveyor 10, which is illustrated, comprises an endless chain 11 mounted on sprockets 12, 13, 14 and 15 which are arranged to support the chain for movement in a horizontal plane and in a generally rectangular path. The sprockets 12, 13, 14 and 15 are supported on vertically extending shafts 16, 17, 18 and 19 respectively, which are journaled in a suitable supporting frame structure 20. The chain 11 carries a plurality of egg contents receiving assemblies 21 which are pivotally connected thereto and adapted to be supported in outwardly and downwardly extending relation thereto. Each of the assemblies 21 is detachably supported on the chain 11 by means of a bracket 22.

The bracket 22 includes a plate-like horizontal base portion 23 permanently secured to the top of the links of the chain 11 with a vertical portion 24 depending therefrom in outwardly spaced relation and terminating in a reversely bent upwardly extending outer flange portion 25 which provides, with the portion 24, an upwardly opening pocket or recess for receiving the lower end of a bail 26 which is attached to the assembly 21. A generally U-shaped latch member 27 is pivotally mounted on a pin 28 which is secured on the top of the base plate 23. The latch member 27 has its leg portions 29 depending along opposite side edges of the vertical base portion 24 and normally positioned to prevent removal of the bail 26 from the pocket in which it is received. The top or bight portion of the latch member 27 extends upwardly and rearwardly and serves as a handle 30 for pivoting the legs 29 about the pivot 28 and out of latching relation to permit removal of the bail 26 from the pocket.

Each assembly 21 comprises a bowl-like member 31 which is in the form of a ring shaped to provide upwardly and outwardly tapering inner top wall portions 32 and downwardly and outwardly tapering inner bottom wall portions 33. The bowl 31 is supported on the outer or upper ends of the legs 34 of the generally U-shaped bail 26 when the latter is in its normal supported position in the pocket formed in the bracket 22. A yolk cup 35 which is arranged on the top of a stem 36 serves to close the bottom of the bowl member 31 so that the contents of an egg may be deposited therein. The stem 36 is supported for vertical sliding movement in a pair of vertically aligned guide members which form a depending part of a bracket 37 secured to the outer surface of the bowl 31 and which has a horizontally extending outer end member or arm 38 which is adapted to engage with a supporting member for maintaining the bowl 31 in a horizontal position. A white receiving pan 39 of generally triangular shape is arranged beneath the bowl 31 with the inner edge provided with a pair of bearing members 40 which receive a cross shaft 41 for pivotally supporting the pan 39 on the bail 26. The pan 39 is relatively shallow and the pin 36 on the yolk cup 35 extends into engagement with the bottom of the pan 39 so that swinging movement of the pan 39 about the pivot 41 will raise and lower the yolk cup 35 relative to the bottom opening in the bowl 31 and permit the white to drain out over the edge of the cup 35, when it is separated from the bowl 31, with the yolk being retained in the cup 35. The pan 39 and the cup 35 are arranged relative to each other so that in the normal horizontal position of the pan 39 the cup 35 will be held in closed relation with the bowl 31 and the pan 39 may be pivoted downwardly a very slight amount to separate the top edge of the cup from engagement with the bottom of the opening in the bowl 31.

Figure 1:
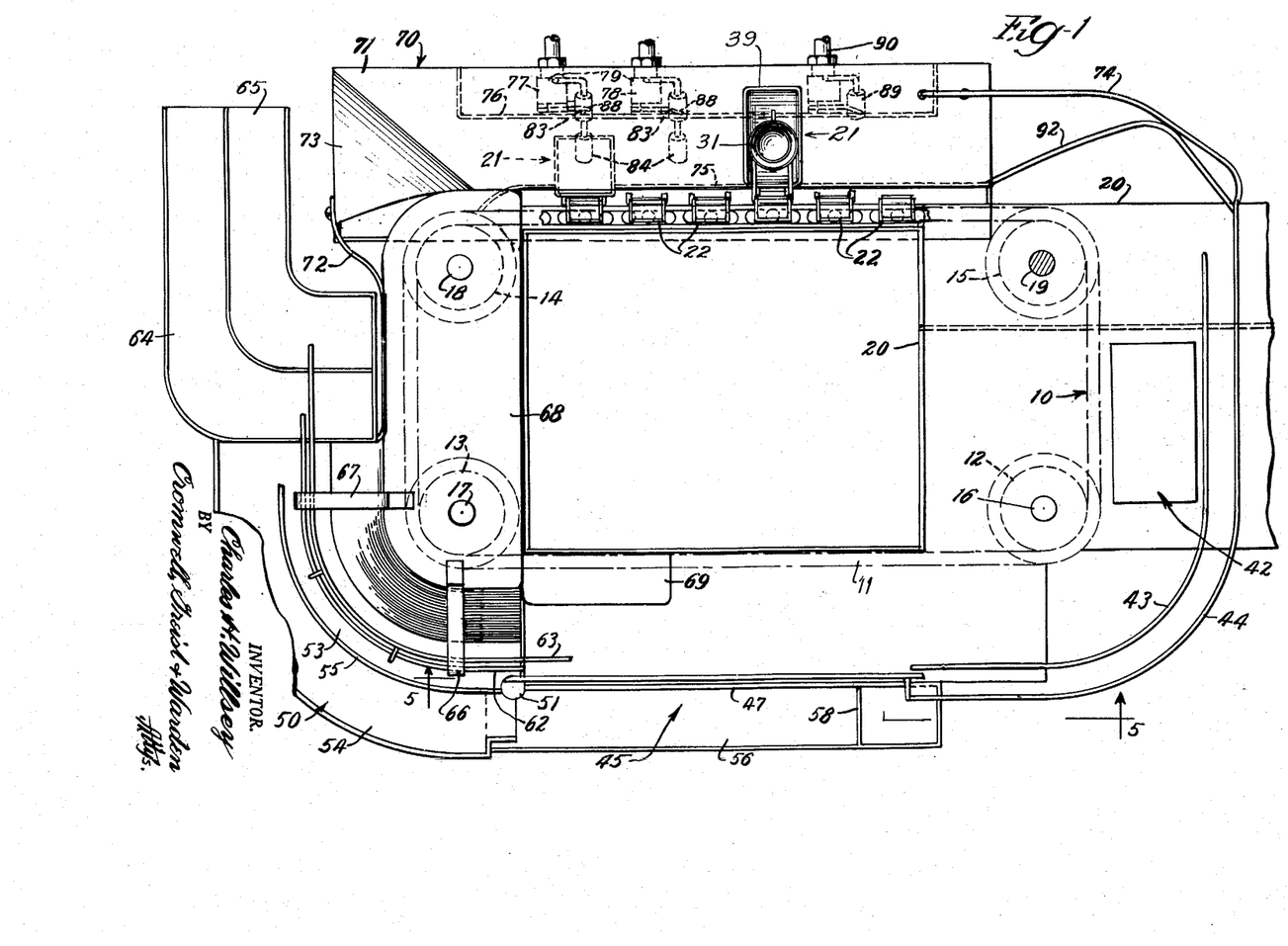
Fig. 1 is a plan view, with portions broken away, of a separating conveyor having incorporated therein mechanism embodying the principal features of the invention.
Figures 5, 6, 7:
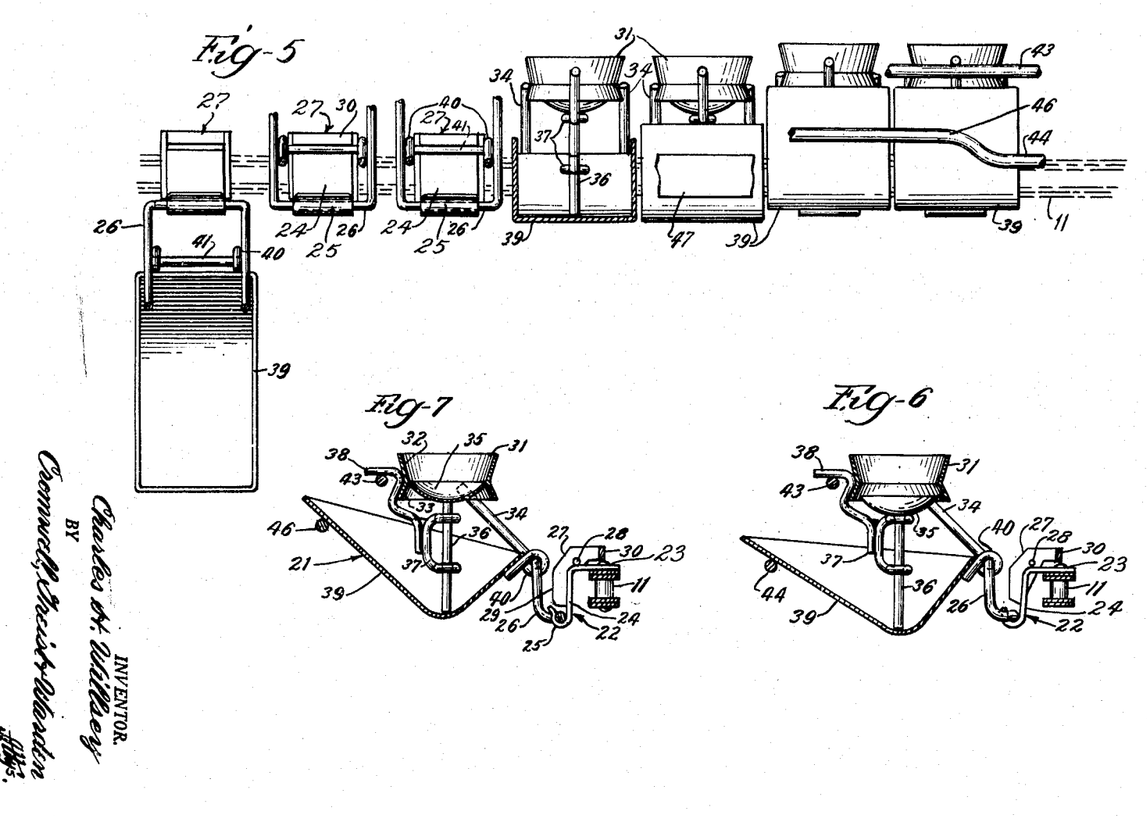
Fig. 5 is a section taken on the line 5—5 of Fig. 1, to an enlarged scale and with portions broken away.
Fig. 6 is a section taken on the line 6—6 of Fig. 2, to an enlarged scale.
Fig. 7 is a section taken on the line 7—7 of Fig. 2, to an enlarged scale.

The assemblies 21 are carried by the conveyor chain 11 beneath the cracking station indicated at 42 in Fig. 1 where the bowl portion 31 of each of the assemblies receives the contents of a broken egg. The assemblies 21 are maintained at the cracking station 42 in a generally horizontal outwardly extending position relative to the conveyor chain 11 by the vertically spaced supporting rods or rails 43 and 44. The pan 39 is supported in the position shown in Fig. 6 by the rod or rail 44 while the bowl 31 is supported by the rod or rail 43. Both supporting rods extend parallel to the chain 11 at a distance and elevation sufficient to maintain the pan 39 in a slightly upwardly and outwardly inclined position where the yolk cup supporting pin 36 is lowered sufficiently to position the upper lip of the yolk cup 35 in spaced relation to the bottom edge of the opening in the bowl 31. The cup assemblies 21 are advanced while in this position toward the inspection station indicated at 45 while they are maintained in position by the supporting rails 43 and 44. The pan supporting rail 44 is provided at 46 with an upwardly offset portion or hump which raises the pan 39 and causes the yolk cup 35 to be raised to bring the top edge thereof into engagement with the bottom edge of the bowl 31 which cuts off the white around the edge of the cup 35, the latter being immediately dropped to its initial position until the assembly 21 reaches the end of the rail 44 at the inspection station 45. At the inspection station 45 the entire assembly 21 is supported by the rail 47 which extends along the conveyor 11 at the inspection station 45 and is arranged at an elevation to maintain the pan 39 in its horizontal position provided the operator observes the contents to be in condition for separation of the white from the yolk and allows the assembly to advance along the same.

Figures 2, 8, 9:
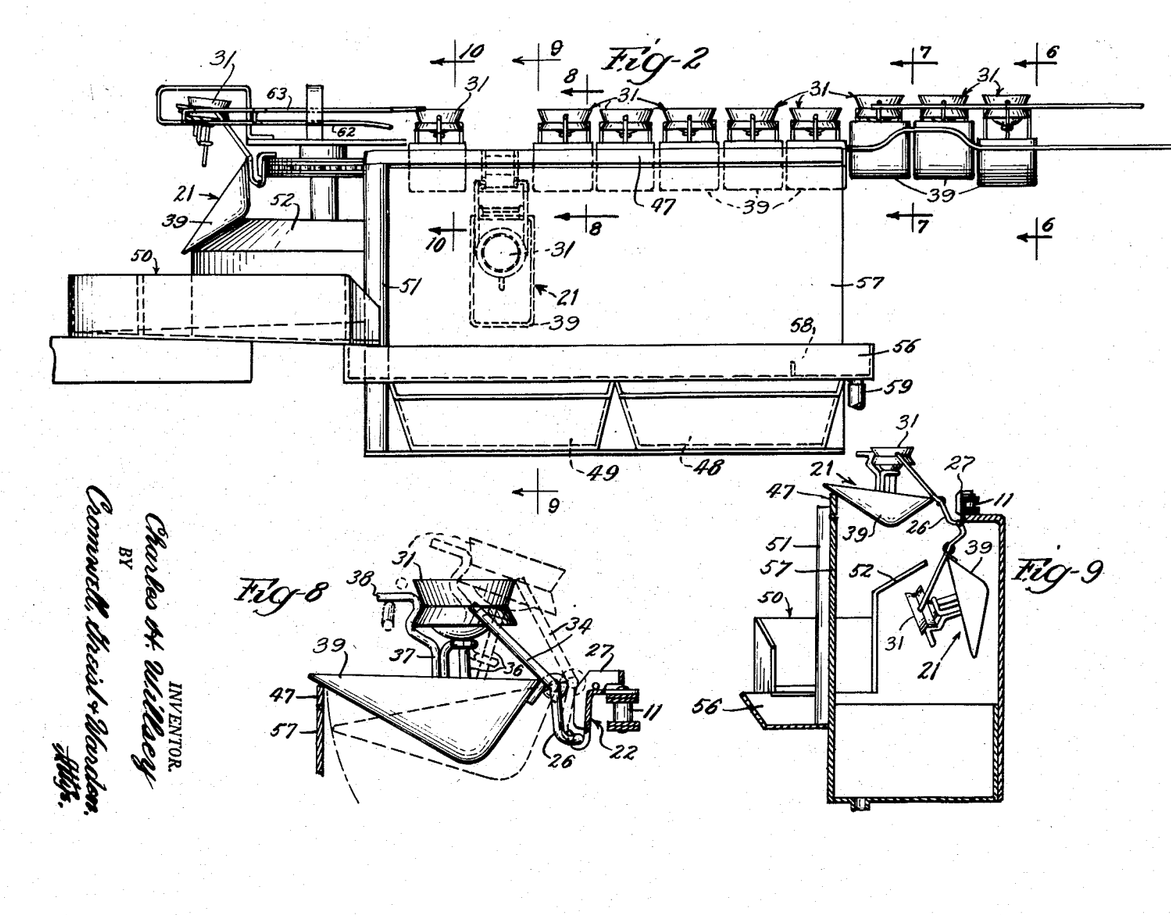
Fig. 2 is a front elevation of the conveyor and its associated mechanism, with portions broken away.
Fig. 8 is a section taken on the line 8—8 of Fig. 2 to an enlarged scale.
Fig. 9 is a section taken on the line 9—9 of Fig. 2.

The operator at the inspection station 45 is able to observe the contents of each bowl 31 and he may dispose of any inedible or broken yolk eggs which he observes by merely pushing on the outer edge of the pan 39 with sufficient force to pivot or swing it in the direction of the conveyor 11 a sufficient distance to cause the end of the pan 39 to drop behind the supporting bar 47 whereupon the assembly 21 will swing to a depending vertical position relative to the conveyor 11 and dump the broken yolk or inedible egg as the case may be into one or the other of the two chutes 48 and 49 (Fig. 2) which are provided beneath the conveyor 11 at the inspection station 45. The chutes 48 and 49 are separated and, of course, deliver the egg contents dumped therein to two different receptacles for removal from the machine.

The assemblies 21 in which the egg contents appears to the operator to be normal, that is, the yolk is not broken and the white and the yolk have separated due to the relative movement of the cup 35 and the bowl 31 and in which there is no indication that the egg is inedible, are allowed by the operator to move past the inspection station 45 in the horizontal position, without any manipulation or movement of the pan 39 to a point near the forward end of the rail 47 where the pan 39 may be moved by the operator relative to the conveyor 11 to position the bowl 31 for dumping the egg yolk into one of two different receptacles at a later point in the advancing movement of the same, depending upon the light or dark condition of the yolk. The supporting rail 47 terminates adjacent the end of a white collecting pan or tray 50. The collecting tray 50 extends from a vertical support member 51 at the end of the supporting rail 47 to a point near the middle of the end of the conveyor 11 beyond the sprocket 13 and is adapted to receive the egg whites from successive pan members 39 which drop off the end of the rail 47 onto a rear sloping shelf 52 of the white collecting tray 50. The pans 39 ride on the shelf 52 and allow the egg whites to drain from the same into the collecting tray 50.

The collecting tray is divided into inner and outer compartments 53 and 54 by a center partition member 55 with the bottom sloped so that the egg material gradually drains to the end of the compartment 54 adjacent the support post 51 which is open and delivers the material into an inspection tray 56 supported in front of the upright plate 57. The inspection tray 56 has a shallow cross partition 58 at one end over which the operator may push the material with a paddle or similar tool at the same time removing any undesirable fat portions or the like. The inspection tray 56 is connected with a suitable collecting receptacle by a conduit which is indicated at 59. The white receiving tray 50 extends from the post 51 which may support one end of the same to a point at the end of the machine where it is supported by a bracket 60 extending outwardly of the main frame of the machine.

Two vertically spaced rail support members 62 and 63 are provided above the tray 50 for selectively supporting the bowl 31 of each assembly in one of two horizontal positions. If the operator does not move or retract the pan 39 of an assembly 21 the projecting bracket or arm member 38 on the bowl 31 remains in position to pass above and ride on the supporting rail 62 as the pan 39 drops off the supporting rail 47. The lower supporting rail 62 extends to a point at the end of the conveyor 11 above the first one of two egg yolk receiving chutes 64 and 65. The contents of the yolk cup 35 is dumped into chute 64 when the arm member 38 drops off the end of the lower supporting rail 62. The yolk collecting chutes 64 and 65 are arranged in adjoining relation and are each extended to dump into a suitable collecting or storage receptacle. The supporting rails 62 and 63 are supported on brackets 66 and 67 which extend upwardly and outwardly of a cover plate 68 on the end of the conveyor 11. The upper supporting rail 63 extends beyond both ends of the lower rail 62 and provision is made at the end adjacent the rail 47 for selectively positioning the bowls 31 to cause the forwardly extending arm members 38 to pass above and ride on the top rail 63. This is accomplished by the operator pushing on the edge of the pan 39 with sufficient force to pivot the bail 26 on the bracket 22 and raise the bowl 31 a predetermined amount sufficient to cause the arm to engage on the rail 63. The amount which the pan 39 can be pushed back or retracted at this point in its travel is limited by an abutment member 69 which extends from the cover plate 68 above the conveyor 11 at a point adjacent the sprocket 13 and projects into the path of movement of the assemblies 21. The supporting rail 47 is spaced relative to the conveyor 11 and the abutment member 69 so that the pan 39 may be retracted part of its maximum distance without being dumped. This raises the bowl 31, due to the pivoting of the bail 26, a distance sufficient to position the arm member 38 so that it will ride on the upper supporting rail 63 which causes the contents of the yolk cup 35 to be dumped into the second chute 65 at the end of the rail 63.

The white collecting pan 50, the rails 62 and 63 and the egg yolk chutes 64 and 65 are spaced a sufficient distance outwardly of the conveyor 11 to provide a passageway for any assemblies 21 which have been swung to the vertical depending position and the contents dumped at the inspection station 45. Such assemblies pass between the tray 50 and the frame support for the conveyor and enter a sterilizing or washing unit 70 which is arranged along the rear of the conveyor 11.

Figure 3:
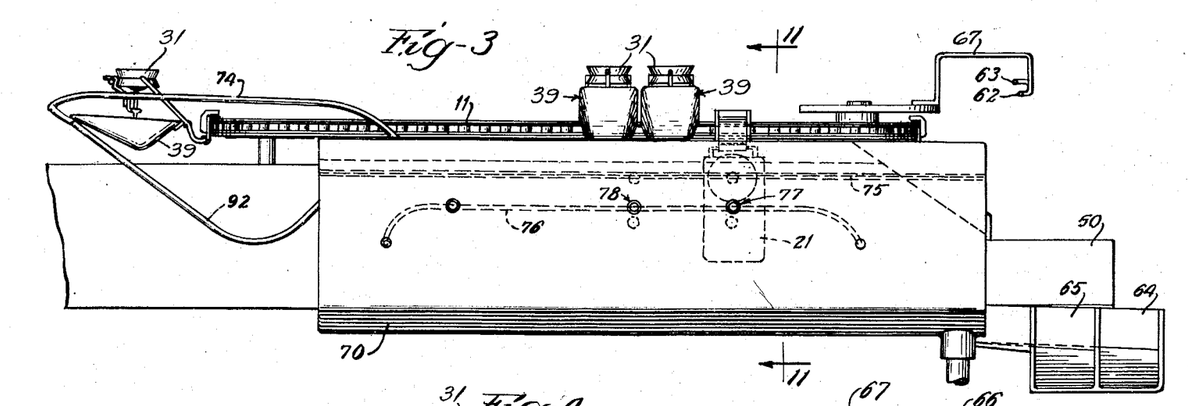
Fig. 3 is a rear elevation of the conveyor and its associated mechanism, with portions broken away.
Figure 4:
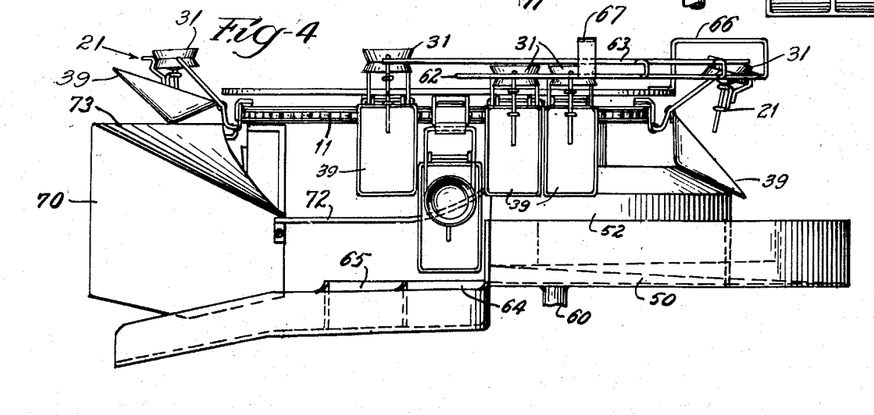
Fig. 4 is an end elevation of the conveyor and its associated mechanism, with portions broken away.

The washing unit 70 (Figs. 1, 3 and 11) is in the form of a cage or compartment having its top 71 positioned relative to the conveyor 11 to support the pans 39 of those assemblies 21 in which the egg contents have been separated with the white dumped into the collecting tray 50 and the yellow dumped into the chutes 64 and 65. A curved rail 72 extends from the end of tray 50 to a downwardly curved corner portion 73 of the top plate 71 of the washer 70 for raising or guiding these assemblies 21 to the top 71 of the washer unit 70 over which they travel until they reach a supporting rail 74 at the end of the conveyor adjacent the cracking station 42. Those assemblies 21 which are dumped at the inspection station 45 to dispose of a broken yolk or an inedible egg and consequently hang below the conveyor 11 are carried by the conveyor 11 through the passageway between the conveyor 11 and the tray 50 and enter the open end of the washing unit 70 adjacent the end of the conveyor 11.

Figure 11:
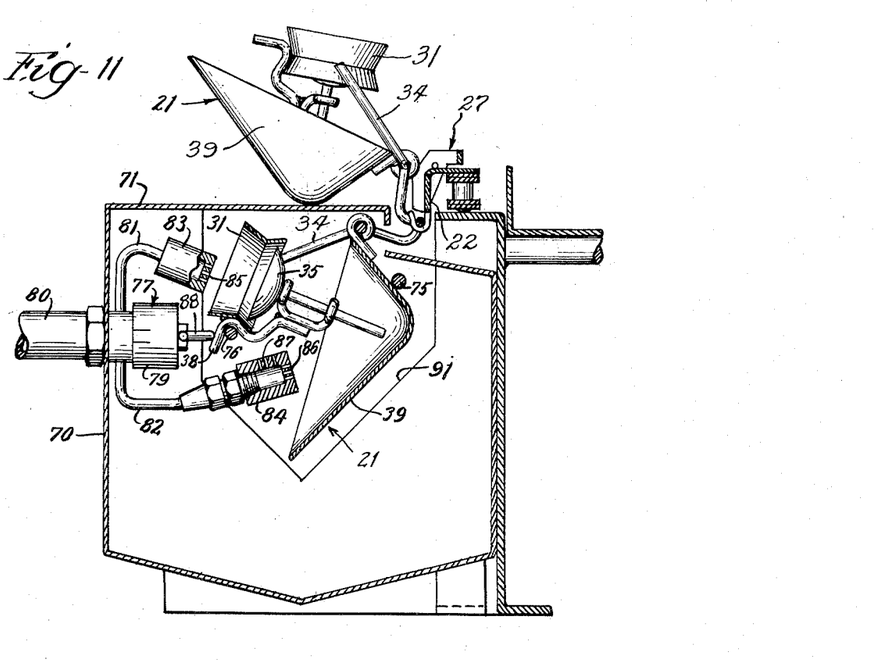
Fig. 11 is a section taken on the line 11—11 of Fig. 3, to an enlarged scale.

The washing compartment 70 is provided with guide rails 75 and 76 which guide the assemblies 21 through a portion of the compartment with the pan 39 and the bowl portion 31 in partially depending and separated relation as in Fig. 11. The assemblies 21 move past two successive washing devices indicated at 77 and 78, which are identical, and only one of which will be described. The washing device at 77 comprises a valve 79 which is connected by a supply pipe 80 to a liquid supply and by two conduits 81 and 82 to upper and lower spray nozzles 83 and 84. The upper spray nozzle 83 is pointed at approximately the center of the bowl member 31 and sprays cleansing or sterilized liquid through the end spray apertures 85 directly into the same. The lower spray nozzle 84 is pointed at the inside of the pan 39 and is located between the outer end of the pan 39 and the bottom of the bowl 31 so that spray apertures 86 in the end thereof direct the washing liquid into the pan 39 and spray apertures 87 in the upper side wall of the nozzle direct the washing liquid onto the surfaces beneath the bowl member 31 and the yolk cup 35, thereby insuring that all surfaces are treated with the liquid. The valve 79 is provided with an operating or actuating arm or handle 88 which is engaged by the extending bracket arm 38 on the bowl 31 as an assembly 21 moves into position to receive the spray liquid from the nozzles 83 and 84. The actuating arm 88 is spring urged to retain the valve 79 normally in closed condition so that the spray is applied to the assembly 21 only while the latter is moving in front of the nozzles 83 and 84.

An air nozzle 89 is positioned beyond the spray devices 77 and 78 which is connected by a conduit 90 with a suitable air supply and which is of the same construction as the spray nozzle 84. The air nozzle 89 is positioned in approximately the same location relative to the assemblies 21 as the spray nozzle 84 so that a blast of air may be directed onto the surfaces of the pan 39 and bowl 31 to remove the spray liquid and dry off the assembly before it approaches the cracking station 42.

The bars or rods 75 and 76 support the assemblies 21 in the washing device 70 and direct the washed and sterilized assemblies to an aperture 91 in the end of the washer 70 where the pan 39 engages with a curved rail 92 which raises each assembly 21 to a horizontal position as they reach the cracking station 42.

In the operation of the apparatus the conveyor 11 carries successive separating assemblies 21 to the cracking station 42 to receive therein the contents of an egg. Each assembly 21 is supported at the cracking station 42 by the rails 43 and 44 in generally horizontal position with the yolk cup 35 lowered to provide a space between the top rim thereof and the bowl member 31 so that the egg white may drain over the edge of the yolk cup 35 and into the pan 39 as the receptacle advances toward the operator who is located at the inspection station 45. As an assembly moves along the rails 43 and 44 the pan 39 is elevated by the rail section 46 (Figs. 5 and 7) to cause the upper edge of the cup 35 to engage with the bottom edge of the inner surface 32 of the bowl member 31 and cut off the white around the same. When the assembly reaches the rail 47 (Figs. 2, 5, 8 and 9), where both the bowl 31 and the pan 39 are supported by the rail 47, the operator notes the condition of the contents in the cup 35 and pan 39. If the contents is scrambled, that is the yolk is broken, the operator immediately retracts the pan 39 by pushing the forward edge thereof back off the rail 47 and allows the entire assembly 21 to swing to a depending vertical position which dumps the contents into the chute or receptacle 48 which delivers the same to a whole egg collecting container (not shown). If the contents of an assembly appears inedible the pan 39 is retracted to dump the contents into the chute or receptacle 49 which delivers the same to a spoiled egg collecting container (not shown). When an assembly 21 is moved to swing to the vertical position to dump either a broken yolk or a spoiled egg the emptied assembly continues to move in the depending position in a path beneath the conveyor 11 until it reaches the washing device 70. Such assemblies are washed or sterilized by the spray washing devices 77 and 78 and dried by the air nozzle 89. They emerge from the washing device 70 and are supported by an upwardly inclined guide rail 92 which brings them up to a horizontal position as they move to the cracking station 42 to receive a fresh egg.

Figure 10:
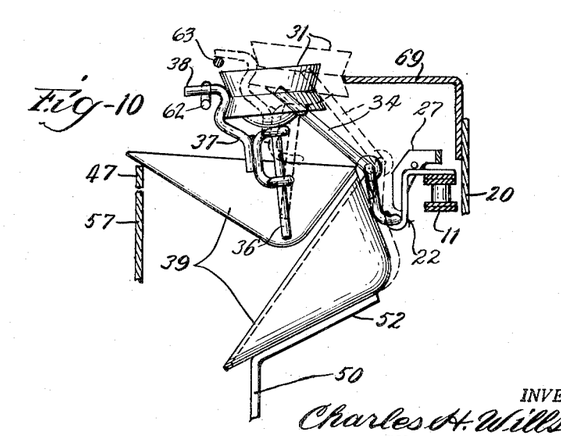
Fig. 10 is a section taken on the line 10—10 of Fig. 2 to an enlarged scale.

When the operator observes at the inspection station 45 that the contents in an assembly 21 is in normal, unbroken condition the color of the yolk is observed and the dark and light yolks may be deposited in separate collection receptacles by allowing the bowl 31 to advance with the supporting arm 38 in position to pass onto the lower supporting rail 62 (Fig. 10) or by retracting the pan 39 sufficiently to elevate the bowl 31 and engage the arm 38 on the upper rail 63. In either case while the bowl 31 is supported in generally horizontal non-dumping position by the rail 62 or 63 the pan 39 swings downwardly about the pivot 41 as it leaves the rail 47 to an inclined position where it rests on the inclined back shelf 52 of the white collecting pan 50 as it advances around the sprocket 13, permitting the white in the pan 39 to drain into the back compartment 53 of the collecting pan 50. The yolk is dumped or discharged from the yolk cup 35 when the assembly 21 reaches the end of the rail 62 or 63, depending upon which of the rails is supporting the bracket arm 38, and delivered by chute 64 or 65, as the case may be to a collecting receptacle for the same (not shown). Since these assemblies are in condition for reuse they are guided by rail 72 to the top 71 of the washing compartment 70 and pass along the same to the rail 74 which guides them to the rail 44 at the cracking station 42.

Each of the assemblies 21 may be completely removed from the conveyor at any time, by the operator, upon pivoting the latch member 27 on the supporting bracket 22, and replaced by a new assembly. The various collecting pans and chutes are detachably or removably supported on the machine frame 20 so that they may be readily removed for cleaning when desired.

While specific details of construction have been referred to in describing the illustrated form of the machine it will be understood that other details of construction may be resorted to within the spirit of the invention.

I claim:

1. An egg contents separating means comprising an endless conveyor having a plurality of receptacles swingably mounted thereon for movement from a generally horizontal position for receiving the contents of an egg to a general vertical contents dumping position, said receptacles each comprising an upper bowl forming member having a central aperture, a yolk receiving cup, means including a vertical pin movably mounting said yolk cup below said aperture, a lower pan-forming member having a bottom portion into which the lower end of said pin extends, means mounting said pan forming member and said bowl forming member in swingable relation to each other and to engage the lower end of said pin with the bottom portion of said pan forming member and move the yolk receiving cup upwardly into said aperture in the bowl forming member, a bracket arm on said bowl forming member and a pair of supporting rails extending beneath said bracket arm and said pan forming member, respectively, along a portion of the path of said receiving conveyor for maintaining said members in a horizontal position during their movement along said portion of said conveyor path, said members being swingable to a vertical depending position at the end of said supporting rail to dump the contents therefrom, and a third supporting rail extending a predetermined distance beyond said pair of supporting rails and engageable beneath said pan forming member whereby the receptacles are maintained in horizontal non-dumping position for a predetermined distance beyond the end of said supporting rail.

2. An egg contents separating apparatus comprising an endless conveyor and a plurality of egg receiving and separating assemblies pivotally mounted outboard of said conveyor to swing in planes extending transversely of the path of movement of the conveyor from a generally horizontal to a generally vertical position, each of said assemblies being adapted to receive the contents of an egg, said assemblies comprising a supporting bail member, which is pivotally connected at its inner end to the conveyor, a ring member mounted at the outer end of the bail member, a guiding and supporting member extending in spaced relation outboard of the conveyor, said ring member having an outwardly extending projection which is adapted to rest on said guiding and supporting member, a yolk cup having an upper edge positioned for seating against a bottom forming portion of said ring member and cooperating therewith to form an upwardly opening receptable, a pin depending from said yolk cup and a depending bearing bracket on said ring member for supporting said pin for vertical sliding movement, a white receiving pan of generally triangular cross section, said pan having a rear wall pivotally connected to said bail member intermediate the ends of the latter and having a bottom wall, a second guiding and supporting member extending along said conveyor in vertically spaced relation to said first guiding and supporting member when said pan is in outwardly extended relation relative to said conveyor, said pan having its bottom wall seated on said second guiding and supporting member, said yolk cup supporting pin being positioned to engage within said pan whereby upon lowering and raising said pan the yolk cup is moved into and out of engagement with the edge of the bottom opening in said ring member to permit the white to drain out over the edges of said yolk cup and to cut off the white from the yolk, and said second guiding and supporting member having portions at different elevations to raise and lower said pan as it moves along the same.

3. An egg separating apparatus comprising an endless conveyor and a plurality of egg receiving and separating assemblies mounted outboard of said conveyor to swing in planes extending transversely of the path of movement of the conveyor from a generally horizontal to a generally vertical position, each of said assemblies being adapted to receive the contents of an egg, said assemblies comprising a bail member, a receptacle forming ring mounted at the outer end of the bail member, said bail member being pivotally connected at its inner end to the conveyor, said ring member having an outwardly extending projection, and a horizontal guiding and supporting rail for said ring member extending in spaced relation outboard of the conveyor, a yolk cup positioned for seating its upper edge against a bottom forming portion of said ring member and cooperating therewith to form an open-topped receptable, a pin supporting said yolk cup and a depending bearing bracket on said ring member for supporting said pin for vertical sliding movement relative to said ring member, a white receiving pan of generally triangular cross section, said pan having its rear wall pivotally connected to said bail member intermediate the ends of the legs of said bail member and a second horizontal guiding and supporting rail extending along said conveyor for engaging beneath said pan when it is in outwardly extended relation relative to said conveyor, said cup supporting pin being positioned to engage within said pan whereby upon lowering and raising said pan the yolk cup is moved into and out of engagement with the edge of the bottom opening in said ring member to cut off the yolk.

4. An egg separating apparatus comprising an endless conveyor and a plurality of egg receiving and separating assemblies mounted outboard of said conveyor to swing in planes extending transversely of the path of movement of the conveyor from a generally horizontal to a generally vertical position, each of said assemblies being adapted to receive the contents of an egg, said assemblies comprising a bail member, an upper receptacle forming ring member mounted at the outer end of the bail member, said bail member having an inner end pivotally connected to the conveyor, said ring member having an outwardly extending arm, and a horizontal guiding and supporting rail extending in spaced relation outboard of the conveyor for engaging beneath said arm, a yolk cup positioned with its upper edge seated against a bottom forming portion of said ring member and cooperating therewith to form an open-topped receptacle, a pin supporting said yolk cup and a depending bearing bracket on said ring member for supporting said pin for vertical sliding movement relative to said ring, a white receiving pan of generally triangular cross section, said pan having its rear wall pivotally connected to said bail member intermediate its ends, a second horizontal guiding and supporting rail extending along said conveyor for engaging beneath said pan when said pan is in a generally horizontal position, said cup supporting pin being positioned to engage within said pan, said supporting rails being positioned for lowering and raising said pan relative to said ring member whereby the yolk cup is moved into and out of engagement with the edge of the bottom opening in said ring member to permit separation of the white from the yellow and a third guiding and supporting rail extending beyond said first and second rails and positioned for engaging beneath said arm upon movement of said pan toward said conveyor to cause said bail to raise said arm a predetermined distance.

5. An egg contents separating mechanism comprising an endless conveyor supported for movement in a horizontal path, a plurality of egg contents receiving and separating assemblies mounted on said conveyor for outwardly and downwardly swinging movement relative thereto from a generally horizontal to a generally vertical position, said assemblies each comprising a supporting bail member, an upper bowl forming portion, and a lower pan forming portion, the bowl forming portion being mounted on the outer end of said bail member and the bail member being connected at its inner end to the conveyor and the pan forming portion being pivotally mounted at its inner end on an intermediate portion of said bail member, said upper bowl portion of said assembly having a bottom in the form of a cup of a size sufficient to accommodate the egg yolk and allow the egg white to spill over the top edge thereof, said yolk cup having a pin-like supporting member, said bowl portion having a depending bracket, said pin member being slidably mounted in said depending bracket and having its end supported in the bottom of said pan when said pan and said bowl are in outwardly extending horizontal position, upper and lower guiding and supporting rails mounted in fixed relation adjacent the path of travel of the conveyor and spaced outwardly thereof for engaging beneath the pan and a portion of the bowl, one of said supporting rails having an offset portion which causes the pan and the bowl to move toward and from each other as they pass over said rails whereby to separate and re-engage the upper edge of the yolk cup with the bottom of the bowl portion and thereby to cut off the white from the yolk.

6. An egg contents separating mechanism comprising an endless conveyor supported for movement in a predetermined path, a plurality of egg contents receiving and separating assemblies mounted on said conveyor for outwardly swinging movement relative thereto from a generally horizontal to a generally vertical position, said assemblies each comprising a supporting bracket, an upper bowl formation and a lower pan formation, the bowl formation being pivotally mounted on the outer end of said supporting bracket, which supporting bracket is pivotally connected to the conveyor, and the pan formation being pivotally mounted on an intermediate portion of said supporting bracket, a yolk cup forming the bottom of said upper bowl formation of said assembly, said yolk cup having a supporting pin, said bowl formation having a depending bracket, said pin being slidably mounted in said bracket and having a portion extending into the bottom of said pan formation when said pan formation and said bowl formation are in outwardly extending generally horizontal position, upper and lower guiding and supporting rails mounted in fixed relation to the path of travel of the conveyor and spaced outwardly thereof for engaging beneath the bowl formation and the pan formation, respectively, one of said supporting rails having an offset portion which causes the pan formation and the bowl formation to move relative to each other as they pass over the same whereby to separate and re-engage the upper edge of the yolk cup with the bottom edge of the bowl formation and cause the egg white to separate from the egg yolk, said upper supporting rail terminating at a predetermined point, and a pair of vertically spaced supporting rails extending beyond said point which are positioned to selectively engage said bowl formation upon movement of said pan formation to position said bowl formation for engagement with said supporting rails.

7. An egg contents separating means comprising an endless conveyor having a plurality of receptacles mounted thereon, which receptacles are each adapted to receive and separate the contents of an egg, said receptacles each comprising an upper bowl forming portion having a central bottom aperture and a yolk receiving cup adapted to engage the bottom rim of said aperture, said cup having a vertical supporting pin, said bowl forming portion having a depending bracket provided with a vertically extending guideway for receiving said vertical pin in sliding relation therein, said receptacle having a lower pan forming portion beneath said bowl forming portion, said bowl forming portion having a depending bail member pivotally connecting one side thereof to said conveyor and said pan forming portion being pivotally connected at one end of said bail member with the other end thereof supported in a generally horizontal position outwardly of said conveyor and beneath said bowl forming portion, the lower end of the vertical pin being positioned to engage within the pan forming portion to support the yolk cup and the bowl forming portion above the same when the pan forming portion is in a horizontal position, a supporting rail extending along a portion of the path of said conveyor for engaging beneath said pan forming portion and supporting the same in a horizontal position during the movement thereof along the same, said bowl forming portion having a forwardly extending arm at the side opposite the bail, and a supplemental supporting rail extending a predetermined distance along said conveyor above said first mentioned supporting rail which is engageable beneath the extending arm on said bowl forming portion and said supporting rails being arranged with portions thereof at different elevations whereby said yolk cup is moved into and out of said bottom aperture as the receptacle advances along said supporting rails.

8. An egg contents separating means comprising an endless conveyor having a plurality of receptacles mounted thereon, which receptacles are each adapted to receive and separate the contents of an egg, said receptacles each comprising an upper band-like member forming a bowl having a downwardly opening bottom aperture and a movable yolk receiving cup positioned to close against said aperture, said cup having a vertical supporting pin, said bowl having a depending bracket provided with a vertical guideway for supporting said pin in sliding relation, said receptacle having a relatively shallow pan beneath said bowl, a bail member pivotally connecting one side of said band-like member to said conveyor, said pan being pivotally connected at its rear end to said bail member with the front end thereof positioned to be supported in a generally horizontal position outwardly of said conveyor and in spaced relation beneath said bowl, said supporting pin being positioned to engage with the pan to support the yolk cup and the bowl above the same when the pan is in a horizontal position, a supporting rail extending along a portion of the path of said conveyor for engaging beneath the outer end of said pan to support the same in a horizontal position during the movement thereof along the same, said bowl having a forwardly extending arm, a second supporting rail extending a predetermined distance along said conveyor above said first supporting rail which is engageable beneath the arm on said bowl and said second supporting rail being arranged with a portion thereof at a higher elevation whereby said yolk cup is moved into and out of said bottom aperture as the receptacle advances along said supporting rails.

9. An egg contents separating device comprising an endless conveyor supported for movement in a horizontal path, a plurality of separating assemblies mounted on said conveyor for outwardly and downwardly swinging movement relative thereto from a generally horizontal to a generally vertical position, said assemblies each comprising an upper bowl forming portion and a lower pan forming portion, a bail member pivoted on said conveyor, the bowl portion being mounted on the outer end of said bail member and the pan portion being pivotally mounted at its inner end on an intermediate portion of said bail member, a yolk cup forming a separable bottom for said upper bowl portion of said assembly, a depending bracket secured on said bowl portion said yoke cup being slidably mounted in said depending bracket, means extending between said yolk cup and the bottom of said pan for supporting said bowl portion when said pan portion and said bowl portion are in outwardly extending horizontal position, upper and lower guiding and supporting tracks mounted in fixed relation outwardly of the path of travel of the conveyor and engaging beneath the pan and a portion of the bowl, said tracks terminating at an inspection station, a single track extending beneath the outer end of said pan at said inspection station, a pair of bowl supporting tracks extending for a predetermined distance beyond said inspection station, a white collecting receptacle below said pair of tracks having means to support the pan at a downward and outward inclination while said bowl is supported by one of said pair of tracks, and a pair of yolk collecting chutes at the ends of said pair of tracks.

10. An egg contents separating apparatus comprising an endless conveyor arranged to travel in a horizontal path and a plurality of contents receiving and separating assemblies mounted thereon for swinging movement outwardly of said conveyor from a generally horizontal to a generally vertical position, said assemblies comprising an upper receptacle and a lower white receiving pan, said upper receptacle including a bowl forming member and a yolk cup which is adapted to form a separable bottom therefor, the bowl member and the pan being mounted for swinging movement relative to each other and for simultaneous swinging movement relative to the conveyor, bracket members on the bowl member and extending between the yolk cup and the bowl member for movably supporting the yolk cup on the bowl member, means connected to the yolk cup and extending between the yolk cup and the pan for engaging the pan to move the yolk cup toward and from the bowl member when the pan is swung relative to the bowl member, and fixed cam members extending along the path of the conveyor for engaging with the bowl member and with the pan, respectively, said cam members being positioned at different elevations to support the bowl member and the pan in generally horizontal position throughout a portion of the travel of the assemblies and to cause downward tilting movement of the pan away from the bowl member during a succeeding portion of the travel of the assemblies.

11. An egg contents separating apparatus comprising an endless conveyor arranged to travel in a horizontal path and a plurality of contents receiving and separating assemblies mounted thereon for swinging movement outwardly of said conveyor from a generally horizontal to a generally vertical position, said assemblies comprising an upper ring forming portion, a separable yolk receiving cup adjacent the bottom of said ring portion and a lower white receiving pan, bracket means connecting the ring and the pan with the conveyor for swinging movement toward and from each other and for simultaneous swinging movement relative to the conveyor, means on the ring portion and extending between the yolk cup and the ring portion for supporting the yolk cup for movement into and out of engagement with the bottom edge of said ring portion, means on the yolk cup and extending between the yolk cup and the pan for moving the yolk cup with said pan and away from said ring when the pan is moved away from the ring, and support members extending horizontally for a predetermined distance along the path of the conveyor and engaging with the ring and with the pan, respectively, to support the same in horizontal position throughout a portion of the travel of the assemblies, said support members having portions at different elevations to cause movement of the pan away from the ring and movement of the yolk cup therewith out of engagement with the ring, thereby allowing the white to drain over the edge of the yolk cup and into the pan for subsequent discharge of the white from the pan.

12. An egg contents separating apparatus comprising an endless conveyor arranged to travel in a horizontal path and a plurality of contents receiving and separating assemblies mounted for swinging movement outwardly of said conveyor from a generally horizontal to a generally vertical position, said assemblies comprising an upper receptacle for initially receiving the contents of an egg, which upper receptacle has a rim forming portion and a separable cup-shaped yolk receiving bottom forming member and said assemblies also comprising a lower white receiving pan, means mounting said pan for swinging movement toward and from the upper receptacle and simultaneously therewith outwardly of the conveyor, bracket elements on the upper receptacle and extending between the upper receptacle and the pan for supporting the yoke receiving member for separating movement toward and from the bottom rim portion of the upper receptacle, means extending from the yolk receiving member toward the pan for engaging with the pan and arranged to move the yolk receiving member toward and from the rim portion when the pan is moved toward and from the upper receptacle, and cam means extending horizontally along the path of the conveyor for engaging with the rim portion of the upper receptacle and with the pan to support the same in generally horizontal position throughout a portion of the travel of the assemblies, said cam means having portions at different elevations for supporting the pan in tilted relation with consequent movement of the yolk cup away from the rim portion to allow the white to separate from the yolk by draining over the edge of the yolk cup into the pan and for discharge of the white from the pan.

References Cited in the file of this patent

UNITED STATES PATENTS

| | | |
|---|---|---|
| 1,747,432 | Eskholme | Feb. 18, 1930 |
| 1,840,658 | Dammrich | Jan. 12, 1932 |
| 2,646,163 | Sigler | July 21, 1953 |
| 2,690,837 | Gill | Oct. 5, 1954 |
| 2,718,906 | Adams et al. | Sept. 27, 1955 |
| 2,723,695 | Willsey | Nov. 15, 1955 |